United States Patent
Totsuka (10) Patent No.: US 10,471,845 B2
(45) Date of Patent: Nov. 12, 2019

(54) COIL UNIT

(71) Applicant: SUBARU CORPORATION, Tokyo (JP)

(72) Inventor: Yuta Totsuka, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 0 days.

(21) Appl. No.: 15/809,904

(22) Filed: Nov. 10, 2017

(65) Prior Publication Data

US 2018/0141451 A1    May 24, 2018

(30) Foreign Application Priority Data

Nov. 22, 2016 (JP) .................................. 2016-226386

(51) Int. Cl.
| | | |
|---|---|---|
| *H02J 50/10* | (2016.01) | |
| *B60L 53/39* | (2019.01) | |
| *H02J 50/80* | (2016.01) | |
| *H02J 50/12* | (2016.01) | |
| *H01F 27/28* | (2006.01) | |
| *H01F 38/14* | (2006.01) | |
| *H02J 7/02* | (2016.01) | |

(Continued)

(52) U.S. Cl.
CPC ............... B60L 53/39 (2019.02); B60L 53/12 (2019.02); H01F 27/006 (2013.01); H01F 27/2871 (2013.01); H01F 27/2876 (2013.01); H01F 38/14 (2013.01); H02J 7/025 (2013.01); H02J 50/10 (2016.02); H02J 50/12 (2016.02); H02J 50/80 (2016.02); H02K 3/14 (2013.01); H02K 3/24 (2013.01); *H01F 27/367* (2013.01); *H02J 50/90* (2016.02)

(58) Field of Classification Search
CPC .. B60L 11/1831; B60L 11/1833; B60L 53/39; H02J 7/0027; H02J 50/10
USPC ......................................... 320/104, 108, 109
See application file for complete search history.

(56) References Cited

U.S. PATENT DOCUMENTS

| | | | |
|---|---|---|---|
| 5,270,598 A | | 12/1993 | Holly, III et al. |
| 5,408,209 A | * | 4/1995 | Tanzer ................ F28D 15/0233 320/108 |
| 2018/0254136 A1 | * | 9/2018 | Ueda ....................... H02J 50/10 |

FOREIGN PATENT DOCUMENTS

| | | |
|---|---|---|
| JP | H06-014483 A | 1/1994 |
| JP | 2013-214614 A | 10/2013 |

(Continued)

OTHER PUBLICATIONS

Akio Ueda et al. Coil Device. Mar. 2, 2017. Machine Translation to English of JP 2017-045792A.*

(Continued)

*Primary Examiner* — Edward Tso
*Assistant Examiner* — Aaron Piggush
(74) *Attorney, Agent, or Firm* — Troutman Sanders LLP (57) ABSTRACT

A coil unit configured to be used in contactless transmission of electric power for running a vehicle includes a coil, and a plate-shaped coil holder that holds the coil. The coil holder has a spiral-shaped first passage and a spiral-shaped second passage. The first passage is formed along a plate surface of the coil holder, and a conductor constituting the coil is disposed in the first passage. The second passage is formed along the first passage and at a position that is different from a position of the first passage in at least a direction extending along the plate surface, and a cooling member is disposed in the second passage.

5 Claims, 5 Drawing Sheets (51) Int. Cl.
*H02K 3/14* (2006.01)
*H02K 3/24* (2006.01)
*H01F 27/00* (2006.01)
*B60L 53/12* (2019.01)
*H02J 50/90* (2016.01)
*H01F 27/36* (2006.01)

(56) References Cited

FOREIGN PATENT DOCUMENTS

| JP | 2016-034214 A | | 3/2016 |
|----|---------------|---|--------|
| JP | 2017-045792 A | | 3/2017 |
| JP | 2017045792 A | * | 3/2017 |

OTHER PUBLICATIONS

Notification of Reasons for Refusal dated Aug. 21, 2018 during the prosecution of Japanese Patent Application No. JP2016-226386.

* cited by examiner

COIL UNIT

CROSS-REFERENCE TO RELATED APPLICATIONS

The present application claims priority from Japanese Patent Application No. 2016-226386 filed on Nov. 22, 2016, the entire contents of which are hereby incorporated by reference.

TECHNICAL FIELD

The present disclosure relates to a coil unit that transmits, in a contactless manner, electric power for running a vehicle.

Hitherto, a contactless transmission system that performs contactless transmission of electric power for running a vehicle, such as an electric vehicle (EV), has been proposed (see Japanese Unexamined Patent Application Publication (JP-A) No. 2016-034214). The transmitted electric power is accumulated in a storage battery and is used to run the vehicle. In a contactless power feeding system, a power feeding device is disposed in the ground of a charging spot, and a power receiving device is disposed in the lower portion of the vehicle body. A coil that transmits electric power is mounted on each of the power feeding device and the power receiving device, and the coils are disposed opposite to each other to transmit electric power therebetween.

Typically, coils used in a contactless transmission system of a vehicle each have a spirally wounded shape extending along a plane. Furthermore, there are cases in which the coils having the above shape are each held by a plate-shaped coil holder. A spiral-shaped groove is provided in each coil holder, and each coil is disposed in the corresponding groove. By using the coil holder, handling of the coil becomes easier when manufacturing and installing the contactless power feeding system, and a prevention of contact between a portion of a piece of conductive wire of the coil and another portion of the conductive wire and insulation between the coil and another member can be achieved easily.

Furthermore, since large electric current flows through the coils used in the contactless power feeding system for a vehicle, the coils need to be cooled. Typically, in a case in which a coil holder is employed, the coil is cooled by layering the coil holder and a block-shape cooling layer.

As a related art of the present disclosure, JP-A No. 2013-214614 discloses a coil unit used in a contactless electric power transmission device for an electronic device. In the coil unit, a coil is held by a coil holder. Furthermore, as a related art of the claimed disclosure, JP-A No. 6-014483 discloses a configuration of a phase winding used in, for example, a multiple-phase generator, in which a tube layer through which a cooling medium circulates is interposed between the phase winding.

The inventor has investigated a cooling structure of a coil in a contactless transmission system for a vehicle on the premise that a coil holder holds the coil. An extremely high voltage is generated in the coil that transmits electric power for running the vehicle. Accordingly, in the coil holder, a groove in which a piece of conducting wire is disposed is provided with a gap between two sections of the groove adjacent to each other so that a predetermined insulation distance is maintained. Furthermore, the coil used in the contactless power feeding system for a vehicle has a heavy weight. Accordingly, the coil holder has a predetermined thickness so as to meet strength and shock resistance requirements.

Accordingly, when a structure in which the block-shaped cooling layer is layered on the coil holder is employed to cool the coil, a relatively large gap is created between the cooling layer and the coil due to the thickness of the coil holder. Accordingly, an issue arises in that the cooling efficiently decreases. In such a case, in order to obtain a predetermined cooling capacity, the temperature of the coolant needs to be low or the volume of the cooling layer needs to be large. If the volume of the cooling layer is increased, the overall thickness of the coil unit increases such that an issue arises in that a large disposing space of the coil unit is needed when installing the power feeding device of the contactless power feeding system in the charging spot, or when mounting the power receiving device in the vehicle. Herein, a configuration including a coil holder, a coil, and a cooling layer is referred to as a "coil unit".

On the other hand, by reducing the thickness of the coil holders so that the coils and the coil layers are close to each other, the coil cooling efficiency of the coil can be increased accordingly by the approached amount. However, in such a case, an issue that the coils are difficult to handle arises due to a decrease in the strength of each coil holder making it difficult to maintain the rigidity of the coil holders when manufacturing or installing the contactless transmission system.

SUMMARY

It is desirable to provide a coil unit that is capable of increasing the cooling efficiency of the coil and reducing the overall thickness while maintaining a configuration in which the coil is held by the coil holder to facilitate ease of handling.

An aspect of the disclosure provides a coil unit configured to be used in contactless transmission of electric power for running a vehicle, the coil unit including a coil, and a plate-shaped coil holder that holds the coil. In the coil unit, the coil holder has a spiral-shaped first passage in which a conductor constituting the coil is disposed and a spiral-shaped second passage in which a cooling member is disposed. The first passage is formed along a plate surface of the coil holder. The second passage is formed along the first passage and at a position that is different from a position of the first passage in at least a direction extending along the plate surface.

DETAILED DESCRIPTION

Figure 1:
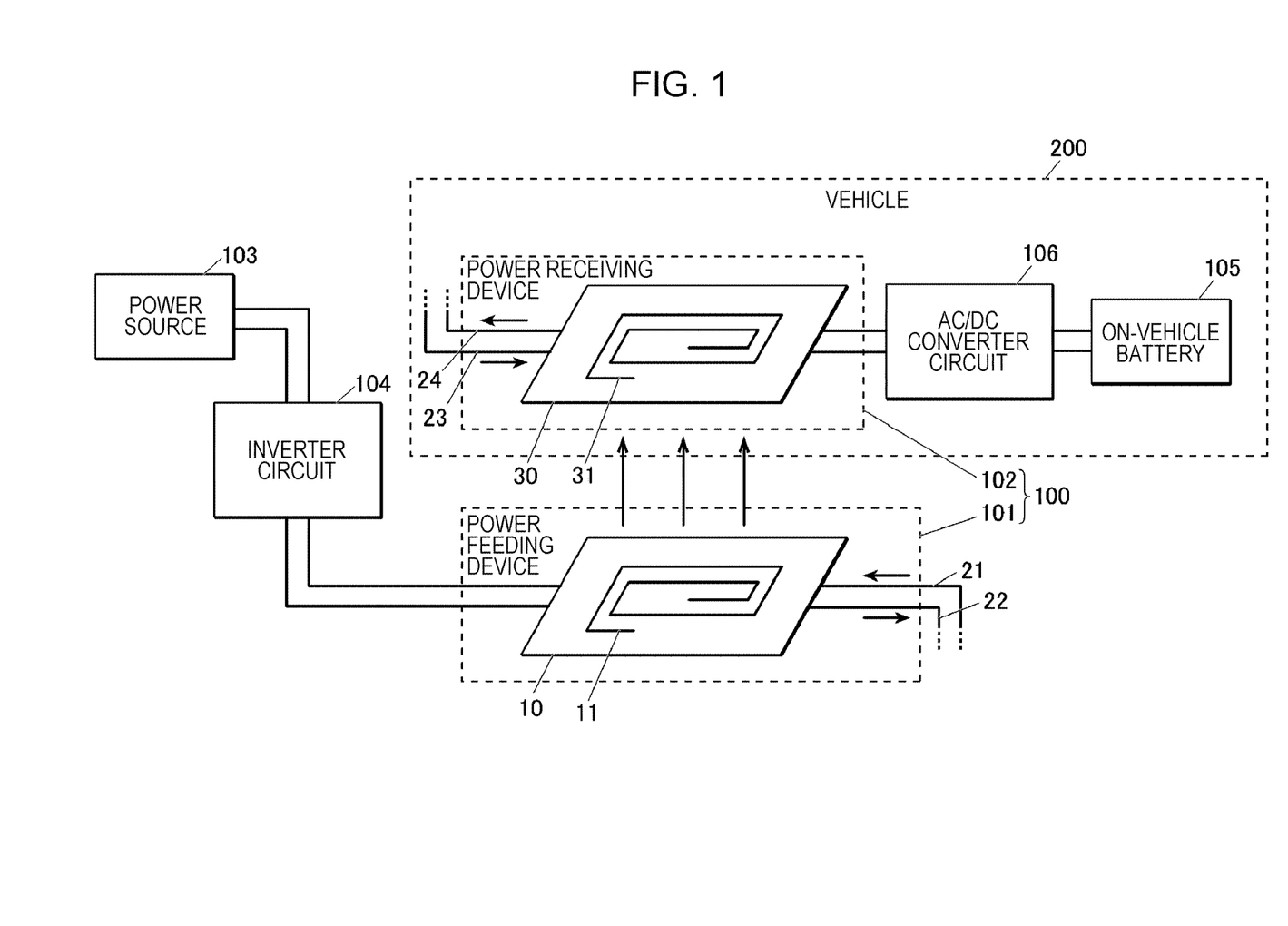
FIG. 1 is a block diagram illustrating a contactless power transmission system according to a first example of the present disclosure.

Hereinafter, examples of the present disclosure will be described in detail with reference to the drawings. FIG. 1 is a block diagram illustrating a contactless power transmission system according to a first example of the present disclosure.

A contactless power transmission system 100 according to an example of the present disclosure is a system that transmits, in a contactless manner, electric power for running a vehicle 200. The contactless power transmission system 100 includes a power feeding device 101 installed in the ground of a charging spot, and a power receiving device 102 mounted on the vehicle 200. A power source 103 is coupled to the power feeding device 101 through an inverter circuit 104. The vehicle 200 is an electric vehicle (EV), a hybrid vehicle (HV), or the like that is capable of being run by electric power. The vehicle 200 includes an on-vehicle battery (a nickel metal hydride battery, a lithium-ion battery, or the like) 105 that accumulates electric power for running the vehicle. An on-vehicle battery 105 is coupled to the power receiving device 102 through an AC/DC converter circuit 106.

The power feeding device 101 and the power receiving device 102 include coil units 10 and 30 including coils 11 and 31 that are in magnetic communication with each other. The power feeding device 101 and the power receiving device 102 are disposed opposite to each other when electric power is transmitted. Subsequently, when electric power is fed from the power source 103, an AC voltage at a predetermined frequency is output to the coil 11 of the power feeding device 101 through the inverter circuit 104. With the above, the power feeding device 101 and the power receiving device 102 become magnetically coupled to each other by a magnetic resonance method or an electromagnetic induction method, and AC power at a predetermined frequency is transmitted to the coil 31 of the power receiving device 102. The AC power that has been transmitted to the coil 31 is converted into DC power through the AC/DC converter circuit 106 and is output to the on-vehicle battery 105. With the above, electric power for running the vehicle is accumulated in the on-vehicle battery 105. Since large electric current flows through the coils 11 and 31, the coils 11 and 31 generate heat.

Furthermore, the power feeding device 101 includes a coolant input portion 21 through which a coolant that absorbs heat of the coil 11 is supplied, and a coolant output portion 22 through which the coolant that has absorbed the heat is discharged. The power receiving device 102 includes a coolant input portion 23 through which a coolant that absorbs heat of the coil 31 is supplied, and a coolant output portion 24 through which the coolant that has absorbed the heat is discharged. While the coolant is not limited to any particular material, the coolant may be a gaseous material, for example. Each of the coolant output through the coolant output portions 22 and 24 are cooled by a radiator or a cooling device and are cyclically sent to the coolant input portions 21 and 23, respectively.

Figure 2:
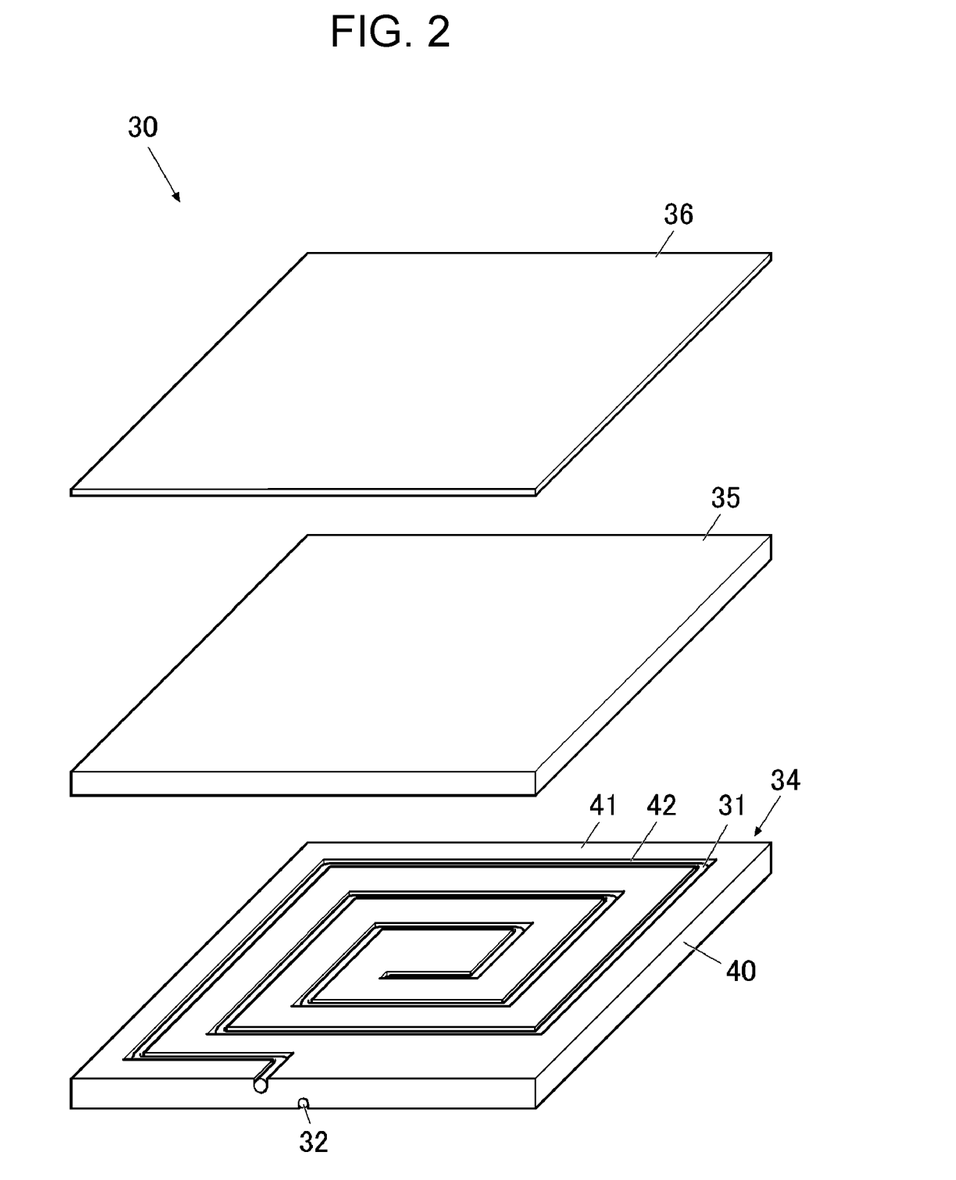
FIG. 2 is a perspective view illustrating a coil unit of the first example of the present disclosure in a decomposed state.

FIG. 2 is a perspective view illustrating the coil unit of the first example of the present disclosure in a decomposed state. Hereinafter, a detailed description of the coil unit 30 of the power receiving device 102 will be given. A detailed description of the coil unit 10 of the power feeding device 101 will be omitted. The basic structure of the coil unit 30 of the power receiving device 102 and that of the coil unit 10 of the power feeding device 101 are the same except that the coil unit 30 and the coil unit 10 are disposed in a vertically inverted manner with respect each other.

The coil unit 30 is used for contactless transmission of the electric power for running the vehicle and, as illustrated in FIG. 2, includes a coil holder layer 34, a ferrite layer 35, and a shielding layer 36.

The ferrite layer 35 has a flat plate shape and is formed of ferromagnet (ferrite or the like) that does not pass electricity. The ferrite layer 35 increases the magnetic lines of force that penetrates the coil 31 and strengthens the magnetic coupling between the power feeding device 101 and the power receiving device 102. Furthermore, the ferrite layer 35 concentrates the magnetic lines of force, which has penetrated the coil 31, in a direction oriented towards the power feeding device 101 and shields the magnetic lines of force leaking in the opposite direction. The ferrite layer 35 is layered above the coil holder layer 34 (the side opposite to the side on which the power feeding device 101 is disposed).

The shielding layer 36 has a flat plate shape and is formed of a material such as, for example, aluminum, that passes electricity. The shielding layer 36 shields the electromagnetic noise that has been generated in the coil unit 30 and that has passed through the ferrite layer 35. The shielding layer 36 is layered above the ferrite layer 35.

Figure 3:
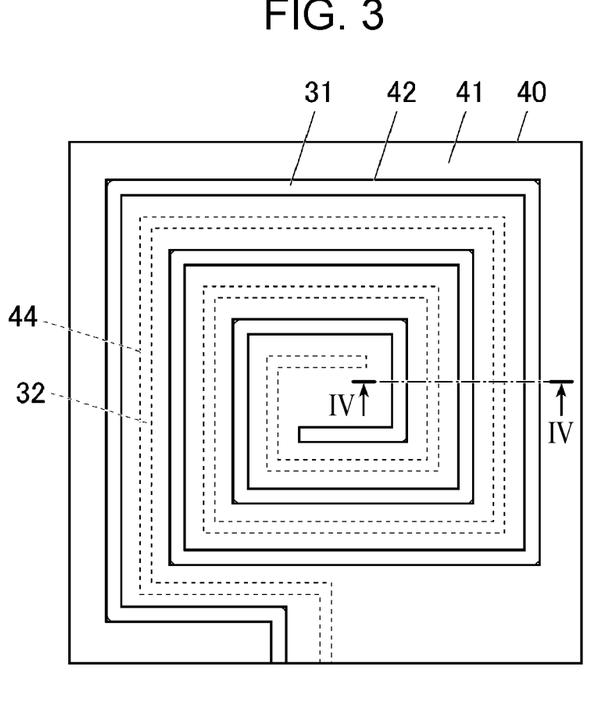
FIG. 3 is a plan view illustrating a coil holder layer according to the first example.
Figure 4:
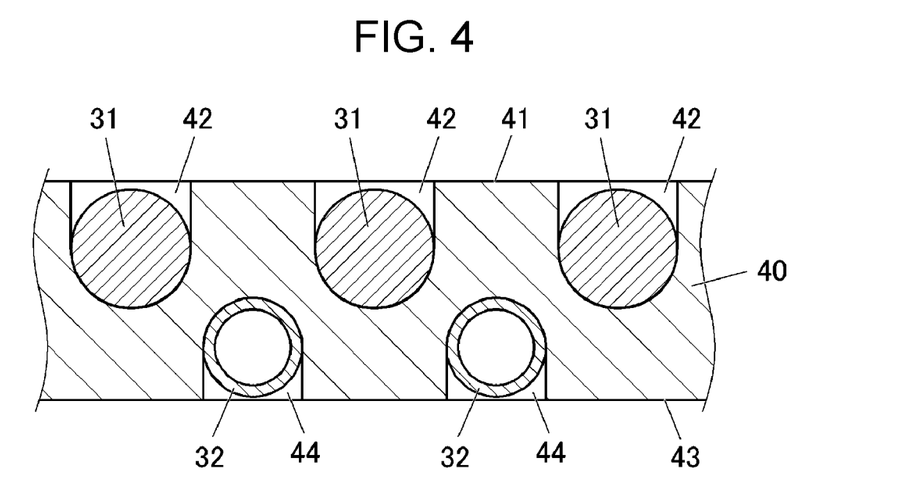
FIG. 4 is a cross-sectional view taken along line IV-IV in FIG. 3.

FIG. 3 is a plan view illustrating the coil holder layer according to the first example. FIG. 4 is a cross-sectional view taken along line IV-IV in FIG. 3.

The coil holder layer 34 includes a coil holder 40, the coil 31, and a coolant pipe 32 through which the coolant is passed. In the first example, the coolant pipe 32 may serve as an example of a cooling material.

The coil holder 40 has a flat plate shape and is formed of an insulating material such as, for example, a resin. As the material of the coil holder 40, desirably, a material that additionally has a high thermal conductivity is employed. A groove 42 is provided in a first plate surface 41 of the coil holder 40 so as to extend along the plate surface 41 in a spiral manner. A groove 44 is provided on an opposite plate surface 43 of the coil holder 40 so as to extend along the plate surface 43 in a spiral manner. In the first example, the groove 42 may serve as an example of a first passage, and the groove 44 may serve as an example of a second passage.

The coil 31 is formed of a piece of stranded metal wire, for example. The coil 31 is disposed in the groove 42 of the coil holder 40. With the above, the spiral shape of the coil 31 is maintained. Relatively large electric current flows through the coil 31 during transmission of electricity and the coil 31 generates heat. Furthermore, the coil 31 has a relatively heavy weight.

The coolant pipe 32 may be a rigid pipe or a flexible pipe. The coolant pipe 32 is formed of a member having high thermal conductivity, and is fitted into the groove 44. A coolant having a temperature that is lower than the temperature of the coil 31 that has generated heat is passed through the coolant pipe 32 to transfer the heat of the coil 32 to the coolant.

As illustrated in FIGS. 3 and 4, the groove 44 in which the coolant pipe 32 is disposed is provided in a route extending along the groove 42 in which the coil 31 is disposed and at a position that is different from the position of the groove 42 in at least a direction extending along the plate surface 41. In other words, when the groove 42 in the first plate surface 41 and the grove 44 in the plate surface 43 on the opposite side are viewed in a direction perpendicular to the plate surface 43, the groove 44 is disposed so that the first groove 42 and the second groove 44 do not intersect each other and the second groove 44 passes between the two sections of the first groove 42 adjacent to each other.

Furthermore, as illustrated in FIG. 4, viewing the grooves 42 and 44 in a cross-section perpendicular to the direction in which the routes of the grooves 42 and 44 extend, and assuming that the direction perpendicular to the plate surfaces 41 and 43 is the up-down direction and the direction extending towards the first plate surface 41 from the plate surface 43 on the opposite side is the up direction, an upper edge second groove 44 is positioned above a lower edge of the first groove 42.

Functions and Effects of Coil Unit

As described above, in the coil unit 30 of the first example, even when the coil holder 40 is relatively thick, the coil 31 and the coolant pipe 32 can be set appropriately close to each other with the disposition of the grooves 42 and 44. Accordingly, the cooling efficiency of the coil 31 can be increased and a predetermined cooling capacity can be obtained with the coolant pipe 32 with less volume. Furthermore, since the groove 44 in which the coolant pipe 32 is disposed has a small volume and is spiral-shaped, the strength of the coil holder 40 is not reduced greatly. Accordingly, the coil holder 40 can hold the coil 31 and the coolant pipe 32 with sufficient strength without increasing the thickness of the coil holder 40. Accordingly, since handling of the coil 31 becomes easier owing to the coil holder 40 when manufacturing or installing the contactless power transmission system 100 and since the coil 31 can be sufficiently cooled with the coolant pipe 32, a reduction in the overall thickness of the coil unit 30 can be achieved. Furthermore, since the grooves 42 and 44 are provided in different lateral surfaces of the coil unit 30 that are opposite each other, formation of the grooves 42 and 44 of the coil unit 30 is facilitated even when the intervals between the groove 42 in which the coil 31 is accommodated are small. Furthermore, since the groove 44 in which the coolant pipe 32 is disposed is provided in the surface opposite to the surface in which the groove 42 is provided, even in a case in which the portions of the groove 42 in which the coil 31 is disposed are close to each other, the coolant pipe 32 can be close to the groove 42 while a sufficient volume in the groove 44 is obtained; accordingly, the cooling efficiency can be increased. Furthermore, in the assembling process of the coil unit 30, cumbersome work in positioning the coil 31 and the coolant pipe 32 to each other is not needed; accordingly, work efficiency is increased.

Figure 8:
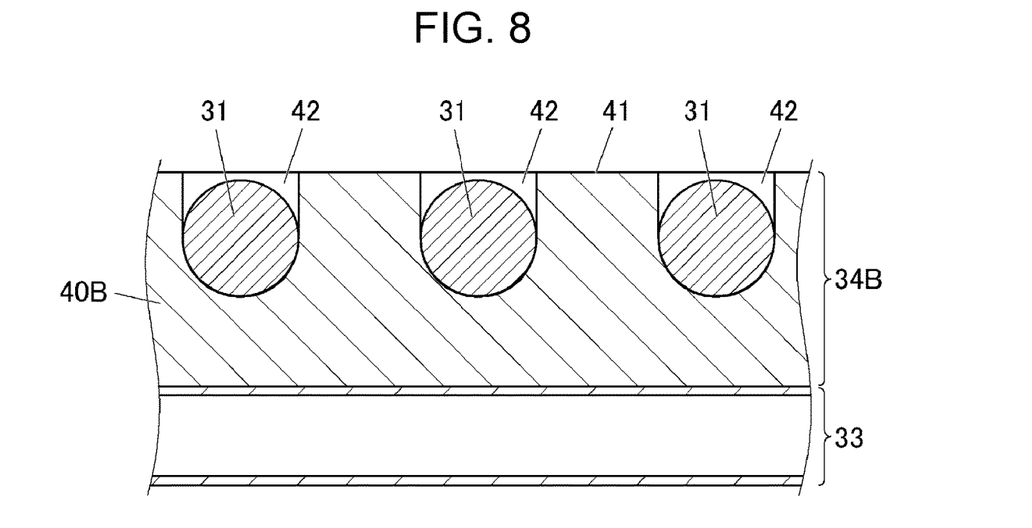
FIG. 8 is a cross-sectional view illustrating a coil holder layer according to a comparative example.

FIG. 8 is a cross-sectional view of a configuration, serving as a comparative example, in which a block-shaped cooling layer 33 is overlaid on a coil holder layer 34B to cool the coil 31. With such a configuration, since the cooling layer 33 and the coil 31 are distanced away from each other due to the thickness of the coil holder 40B, the cooling efficiency of the coil 31 decreases. Accordingly, the volume of the cooling layer 33 needs to be increased to increase the cooling capacity; accordingly, the overall thickness of the coil unit increases. In the coil unit 30 of the first example, the groove 42 and the groove 44 are disposed alternately. With the above, the thickness of the coil unit 30 can be small compared with the thickness in which the coil 31 and the coolant pipe 32 vertically overlap each other, and the coil 31 and the coolant pipe 32 can be disposed close to each other; accordingly, compared with the configuration of the comparative example, a similar cooling capacity can be obtained while noticeably reducing the thickness of the coil unit 30.

Furthermore, according to the coil unit 30 of the first example, even when the portion between the two sections of the first groove 42 adjacent to each other is narrow, the space for providing the groove 44 can be obtained easily since the groove 44 is disposed at a position that is different with respect to that of the coil holder 40 in the thickness direction. Furthermore, since the member of the coil holder 40 is interposed between the groove 42 and the groove 44 with an appropriate wall thickness, high insulation between the conductor of the coil 31 disposed in the groove 42, and the coolant pipe 32 disposed in the groove 44 can be obtained.

Modifications

Figure 5:
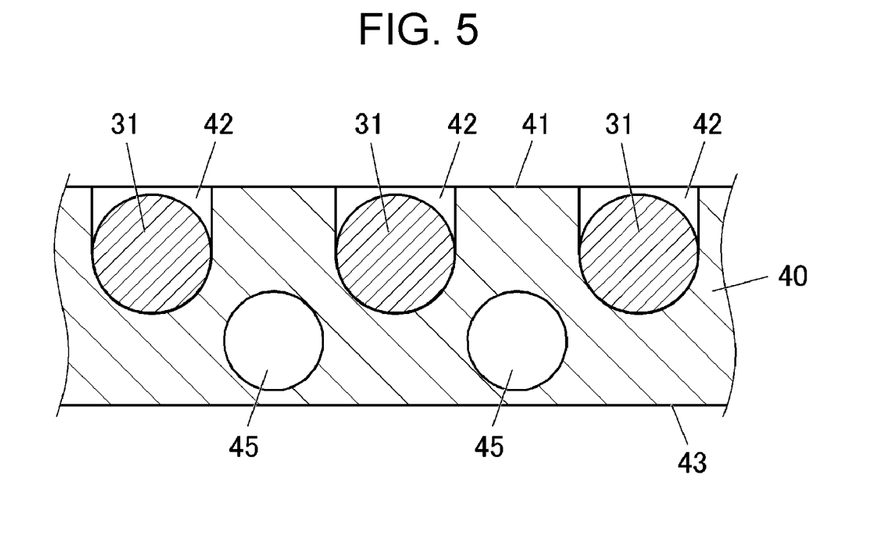
FIG. 5 is a cross-sectional view illustrating a modification of the coil holder layer according to the first example.

FIG. 5 is a cross-sectional view illustrating a modification of the coil holder layer according to the first example.

In the coil holder layer 34 of the modification, a coolant passage 45 through which the coolant flows is provided in the coil holder 40 instead of the coolant pipe 32 and the groove 44. In the modification, the coolant passage 45 may serve as an example of the second passage.

The coolant passage 45 is formed closer to the plate surface 43 on the opposite side than the first plate surface 41 of the coil holder 40. Furthermore, in a cross-section perpendicular to the direction in which the groove 42 and the coolant passage 45 extend, assuming that a direction extending towards the first plate surface 41 from the plate surface 43 on the opposite side is the up direction, the lower edge of the groove 42 is positioned below the upper edge of the coolant passage 45. The coolant directly flows through the coolant passage 45. In such a case, in the modification, the coolant may serve as an example of the cooling material.

Even with the above configuration, effects similar to those of the coil unit 30 of the first example is obtained.

Second Example

Figure 6:
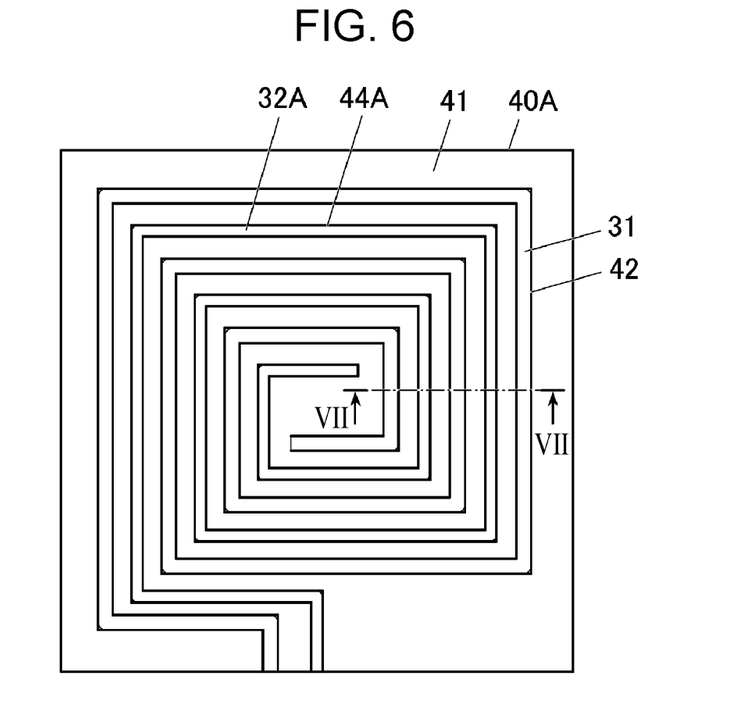
FIG. 6 is a plan view illustrating a coil holder layer according to a second example.
Figure 7:
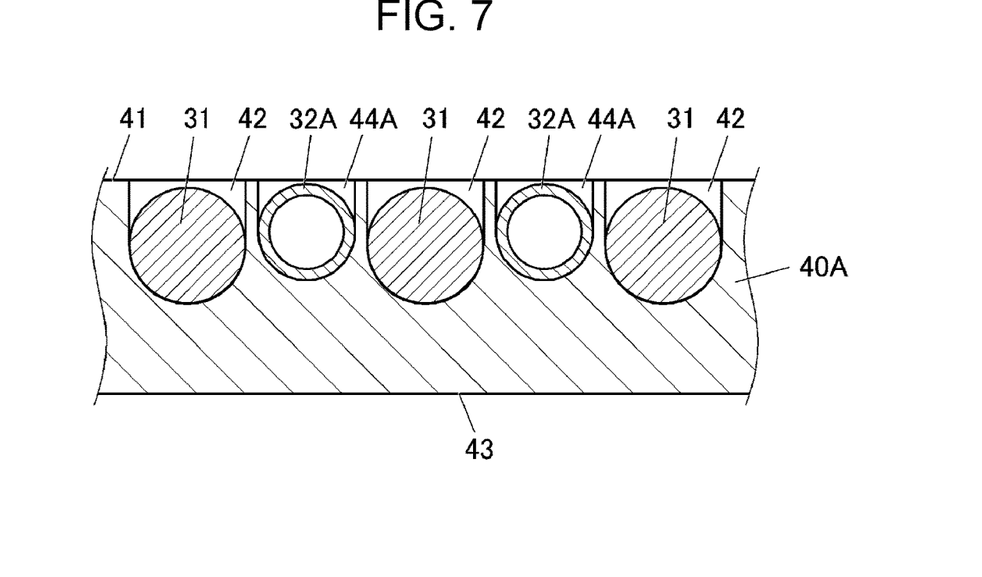
FIG. 7 is a cross-sectional view taken along line VII-VII in FIG. 6.

FIG. 6 is a plan view illustrating the coil holder layer according to a second example. FIG. 7 is a cross-sectional view taken along line VII-VII in FIG. 6.

In the second example, a configuration of a coil holder layer 34A of the coil unit 30 is different from the configuration of the coil holder layer 34 of the first example. Other configurations are similar to those of the first example. Accordingly, detailed descriptions of the configurations that are similar will be omitted.

The coil holder layer 34A according to the second example includes a coil holder 40A, the coil 31, and a coolant pipe 32A through which the coolant is passed.

The coil holder 40A is similar to the coil holder 40 of the first example other than a disposition of a groove 44A in which the coolant pipe 32 is disposed. In the second example, the groove 44A may serve as an example of the second passage.

The groove 44A in which the coolant pipe 32A is disposed has a spiral-shaped route extending along the groove 42 in which the coil 31 is disposed, and is provided in the plate surface 41 that is the same as that of the first groove 42. When viewed in the direction perpendicular to the plate surface 41, a section of the second groove 44A passes through the portion between the two sections of the first groove 42 adjacent to each other. Furthermore, the groove 42 and the groove 44A are disposed at the same height in the plate thickness direction of the coil holder 40A.

The coolant pipe 32A is formed of a member having high thermal conductivity and rigidity, and is fitted into the groove 44A. With the above, the coolant pipe 32A is disposed side-by-side with the coil 31 through a spiral-shaped route extending along the coil 31.

Functions and Effects of Coil Unit

As described above, in the coil unit 30 of the second example, even when the coil holder 40A is relatively thick, the coil 31 and the coolant pipe 32A can be set close to each other with the disposition of the grooves 42 and 44A.

Accordingly, the cooling efficiency of the coil 31 can be increased and a predetermined cooling capacity can be obtained with the coolant pipe 32A with less volume. Furthermore, since the groove 44A in which the coolant pipe 32A is disposed has a small volume and is spiral-shaped, the strength of the coil holder 40A is not reduced greatly. Moreover, the rigid coolant pipe 32A is disposed in the groove 44A. Accordingly, the rigidity of the coil holder 40A is increased with the added rigidity of the coolant pipe 32A even when the wall thickness of the coil holder 40A between the coolant pipe 32A and the coil 31 is small. Accordingly, the coil holder 40A can hold the coil 31 and the coolant pipe 32A with sufficient strength without increasing the thickness of the coil holder 40A. Accordingly, handling of the coil 31 becomes easier owing to the coil holder 40A when manufacturing or installing the contactless power transmission system 100, and a reduction in the overall thickness of the coil unit 30 can be achieved. Furthermore, in the assembling process of the coil unit 30, cumbersome work in positioning the coil 31 and the coolant pipe 32A to each other is not needed; accordingly, work efficiency is increased.

While each of the examples of the present disclosure has been described above, the present disclosure is not limited to the examples described above. For example, regarding the coil 31 and the coolant pipes 32 and 32A, or the coolant passage 45, spiral-shaped forms including straight routes and routes that are bent at right angles have been illustrated in the drawings illustrating the examples described above. However, needless to say, the coil 31 and the coolant pipes 32 and 32A, or the coolant passage 45 may be spiral-shaped forms including curved routes, or spiral-shaped forms including straight routes and curved routes. Furthermore, in the examples described above, a configuration in which the coil 31, the coil holder layer 34 including the cooling structure, the ferrite layer 35, and the shielding layer 36 are layered has been described as the coil unit 30; however, a different layer including another function may be added to the coil unit 30. Furthermore, in the examples described above, the coolant pipe through which the coolant is passed or the coolant have been illustrated as the cooling material; however, a solid having high thermal conductivity, such as a heat pipe, may be used. Furthermore, a liquid, such as a liquid coolant, may be used as the coolant. Other than the above, the details illustrated in the examples may be appropriately modified within the scope of the present disclosure.

The invention claimed is:

1. A coil unit configured to be used in contactless transmission of electric power for running a vehicle, the coil unit comprising:
   a coil; and
   a single coil holder layer including a first surface and a second surface located opposite to the first surface, the single coil holder layer holding the coil on the first surface,
   the single coil holder layer including:
      a first passage that is a spiral-shaped groove formed on the first surface, the first passage in which a conductor constituting the coil is completely disposed, and
      a second passage that is a spiral-shaped groove formed on the second surface, the second surface in which a cooling member is completely disposed,
   wherein an up-down direction is a plate thickness direction of the single coil holder layer, and an up direction is a direction extending towards the first surface from the second surface on the opposite side, an upper edge of the second passage is above a lower edge of the first passage in a cross-section perpendicular to a direction in which a route of the first passage extends and to a direction in which a route of the second passage extends.

2. The coil unit according to claim 1, wherein the cooling material is a coolant pipe through which a coolant is passed.

3. The coil unit according to claim 1, further comprising:
   a ferrite layer that is formed into a flat plate shape and that is formed of a ferromagnet, wherein
   the ferrite layer is on the first surface of the coil holder.

4. The coil unit according to claim 1, further comprising:
   a coil holder layer includes the coil, the coil holder and the cooling member, and
   a ferrite layer that is formed into a flat plate shape and that is formed of a ferromagnet, wherein
   the coil holder is configured to be connected with the ferrite layer via the first surface.

5. A coil unit configured to be used in contactless transmission of electric power for running a vehicle, the coil unit comprising:
   a coil; and
   a single coil holder layer including a first surface and a second surface located opposite to the first surface, the single coil holder layer holding the coil on the first surface, the single coil holder layer including:
      a first passage that is a spiral-shaped groove formed on the first surface, the first passage in which a conductor constituting the coil is completely disposed, and
      a second passage that is shaped a spiral-shaped pipe along the first passage in order to pass liquid coolant, the second passage being completely formed within the single coil holder layer and being located closer to the second surface than the first surface, the second passage being fully surrounded by mass of the single coil holder layer.

* * * * *